US009489724B2

(12) United States Patent
Davies et al.

(10) Patent No.: US 9,489,724 B2
(45) Date of Patent: Nov. 8, 2016

(54) THREE-DIMENSIONAL STEREOSCOPIC PROJECTION ON COMPLEX SURFACES

(71) Applicant: The Boeing Company, Chicago, IL (US)

(72) Inventors: Paul Robert Davies, Long Beach, CA (US); Steven Matthew Gunther, O'Fallon, IL (US)

(73) Assignee: The Boeing Company, Chicago, IL (US)

( * ) Notice: Subject to any disclaimer, the term of this patent is extended or adjusted under 35 U.S.C. 154(b) by 271 days.

(21) Appl. No.: 14/230,706

(22) Filed: Mar. 31, 2014

(65) Prior Publication Data

US 2015/0281629 A1 Oct. 1, 2015

(51) Int. Cl.
*H04N 9/31* (2006.01)
*H04N 13/04* (2006.01)
*G06T 3/00* (2006.01)
*G06T 5/00* (2006.01)

(52) U.S. Cl.
CPC ............... *G06T 5/006* (2013.01); *G06T 3/005* (2013.01); *H04N 9/3185* (2013.01); *H04N 13/0459* (2013.01); *H04N 13/0468* (2013.01)

(58) Field of Classification Search
None
See application file for complete search history.

(56) References Cited

U.S. PATENT DOCUMENTS 7,778,794 B2 8/2010 Davies et al.
2005/0254726 A1* 11/2005 Fuchs ..................... H04N 5/74 382/285
2008/0030575 A1 2/2008 Davies et al.
2011/0169924 A1* 7/2011 Haisty .................. H04N 9/3147 348/51
2012/0098941 A1* 4/2012 Joseph ............... G02B 27/2221 348/51
2012/0162204 A1* 6/2012 Vesely .................. G06F 3/0325 345/419
2012/0162384 A1* 6/2012 Vesely .................. G06T 19/006 348/47
2013/0229396 A1* 9/2013 Huebner .............. H04N 9/3147 345/207
2013/0234934 A1* 9/2013 Champion ............. G06F 3/012 345/156
2014/0056507 A1 2/2014 Doyle et al.
2014/0139717 A1* 5/2014 Short ..................... H04N 7/142 348/333.1
2014/0317575 A1* 10/2014 Ullmann ................. G06T 19/20 715/852
2015/0208019 A1* 7/2015 Stewart ................. G06F 1/1673 348/745

OTHER PUBLICATIONS

Davies et al., "Automated Frame of Reference Calibration for Augmented Reality," U.S. Appl. No. 13/665,837, filed Oct. 31, 2012, 51 pages.

* cited by examiner

*Primary Examiner* — Reza Aghevli
(74) *Attorney, Agent, or Firm* — Miller, Matthias & Hull LLP

(57) ABSTRACT

A method of displaying. The method includes using a system including three-dimensional stereoscopic projection equipment to project an image onto a complex surface of a physical object disposed in an area. The complex surface includes at least one curve or angle. The system also includes a device worn by a user or disposed on a mobile device. The method further includes warping the image based on a geometry of the complex surface, tracking a position and orientation of the user or the mobile device, and further warping the image based on the position and orientation.

15 Claims, 6 Drawing Sheets

100

START

102 WARP THE IMAGE BASED ON A GEOMETRY OF THE COMPLEX SURFACE

104 TRACK A POSITION AND ORIENTATION OF THE USER OR THE MOBILE DEVICE

106 WARP AND MODIFY THE IMAGE BASED ON THE POSITION AND ORIENTATION

END

THREE-DIMENSIONAL STEREOSCOPIC PROJECTION ON COMPLEX SURFACES

BACKGROUND INFORMATION

1. Field:

The present disclosure relates generally to augmented reality, and more particularly to a technique for projecting three-dimensional virtual images onto complex surfaces.

2. Background:

In the manufacturing domain, communicating work instructions to mechanics and technicians on the shop floor can be a challenge. Up to forty percent of a technician's time can be spent on non-value added tasks such as searching for drawings or other job related information. Therefore, it would be desirable to have a method and apparatus that addresses this issue by increasing an efficiency of a mechanic and technician when building devices or performing maintenance on existing devices.

SUMMARY

The illustrative embodiments provide for a method of displaying. The method includes using a system including three-dimensional stereoscopic projection equipment to project an image onto a complex surface of a physical object disposed in an area. The complex surface includes at least one curve or angle. The system also includes a device worn by a user or disposed on a mobile device. The method further includes warping the image based on a geometry of the complex surface, tracking a position and orientation of the user's point of view or the mobile device, and further warping and modifying the image based on the position and orientation.

The illustrative embodiments also provide for a display apparatus. The apparatus includes a system including three-dimensional stereoscopic projection equipment configured to project an image onto a complex surface of a physical object disposed in an area. The complex surface includes at least one curve or angle. The system also includes a device worn by a user or disposed on a mobile device. The apparatus further includes a computer in communication with the system. The computer is configured to cause the system to warp the image based on a geometry of the complex surface and track, using the device, a position and orientation of the user's gaze or the mobile device. The computer is further configured to cause the system to further warp and modify the image based on the position and orientation.

The illustrative embodiments also provide for a display system. The display system includes a set of glasses including a right shutter for covering a right eye of a user and a left shutter for covering a left eye of the user. The display system further includes a plurality of cameras oriented to observe the user as the user moves within an area and to sense a position and orientation of the user in the area. The display system further includes a projector configured to project, onto a complex surface, a right image for the right eye and a left image for the left eye, the complex surface comprising at least one curve or angle. The display system further includes a computer system in communication with the set of glasses, the plurality of cameras, and the projector. The computer system is configured to cause the projector to project the left image when the left shutter is open and to project the right image when the right shutter is open, cause the set of glasses to close the right shutter and open the left shutter when the left image is projected, and to close the left shutter and open the right shutter when the right image is projected. The computer system is further configured to warp the left image and the right image to fit the complex surface. Warping and modification is further based on the position of the user in the area. The left image and the right image are configured such that the user will perceive a three-dimensional image from the user's point of view, projected onto the complex surface.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
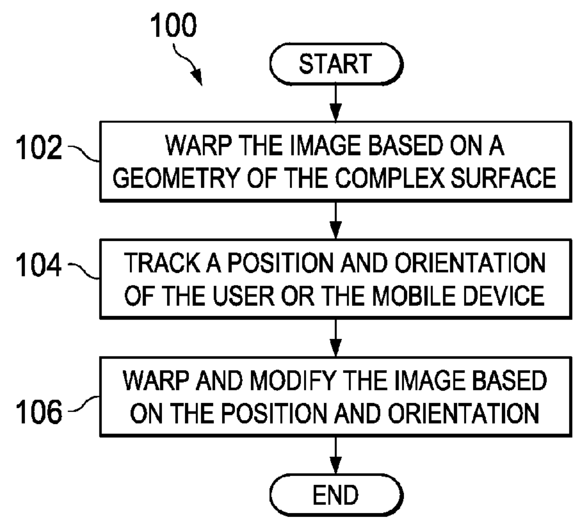
FIG. 1 is flowchart of a method for displaying an image, in accordance with an illustrative embodiment.

The illustrative embodiments recognize and take into account the issues described above with respect to increasing the efficiency of a mechanic or technician when performing maintenance or building devices. Thus, the illustrative embodiments provide for a stereoscopic projection system. In one example, the illustrative embodiments may use active shutter glasses combined with a projector, along with a computer, to project an image onto one or more complex surfaces of a tangible object during the manufacturing process, the image appearing three-dimensional to a user.

By understanding the pose of the projector in relation to the surface and the geometry of the surface itself, the illustrative embodiments may apply a distortion mask to the projected images, warping them such when the images are mapped onto the surface, the integrity of the intended picture is maintained. In other words, when the warping process is applied to the projection, the user may perceive a three-dimensional image projected onto the complex surface. The projection will appear correct to a user regardless of the user's position in a room, the user's head position, or possibly other parameters that could affect how a similar, real object would appear to the user in the same context. The projection could include new parts to be installed, maintenance to be performed, tools to be used, a moving image of a series of actions to be taken, written instructions, and many other useful images.

Thus, the illustrative embodiments provide for a method and a system to use stereoscopic projection on complex surfaces to provide the illusion of a three-dimensional image. In a specific example, a mechanic or technician may use this projection to view, for example, assembly instructions in three dimensions that are spatially registered to the part and directly projected onto the part. These assembly instructions may include a three-dimensional visualization of work instructions.

The illustrative embodiments may be implemented using a number of different techniques for projecting an image that at least appears to be three-dimensional. For example, the illustrative embodiments may use a projector, computer that controls the projector, and a pair of stereoscopic shutter glasses. When one eye of the glasses is shut, the projector projects a first image intended for the opposite eye. When the other eye of the glasses is shut, the projector projects a second image intended for the second eye. The images and shutters alternate more rapidly than the eye can readily perceive; thus, the result when the computer properly controls the projector is an image that appears three-dimensional to a user.

However, the illustrative embodiments are not limited to stereoscopic shutter glasses. For example, the illustrative embodiments may use color glasses, polarized glasses, or other techniques to project a two dimensional image that appears three-dimensional.

The illustrative embodiments may improve manufacturing efficiency and may reduce manufacturing costs. For example, by providing an immersive experience and viewing work instructions, models of parts and other relevant information, efficiency can be increased relative to a mechanic or technician spending time finding and then reviewing two dimensional plans that are not registered to the actual device or part being worked.

Figure 8:
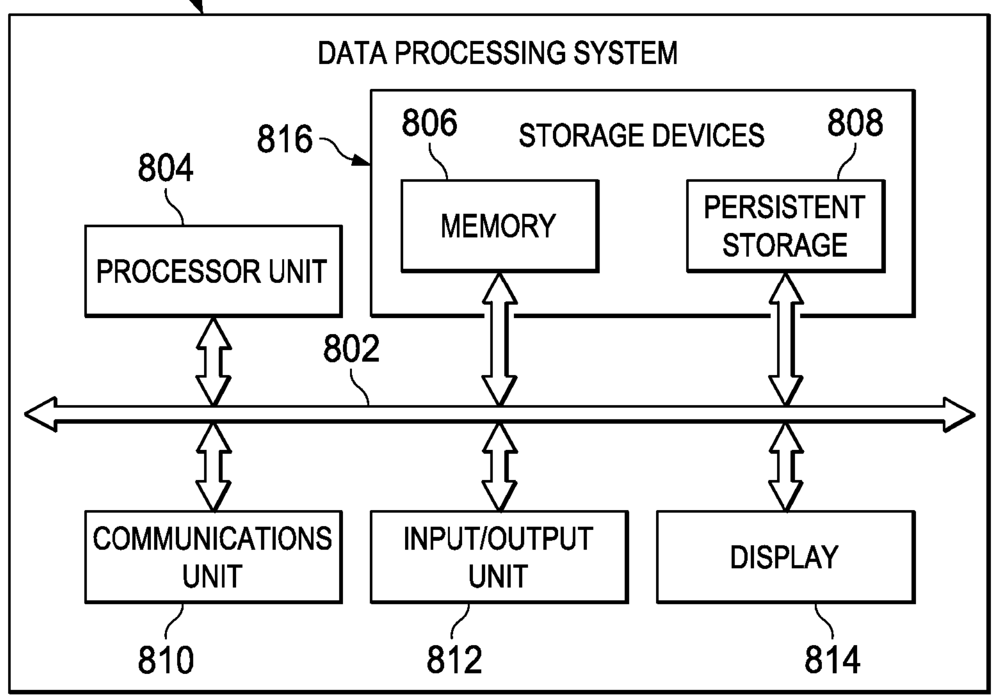
FIG. 8 is an illustration of a data processing system, in accordance with an illustrative embodiment.
Figure 8:
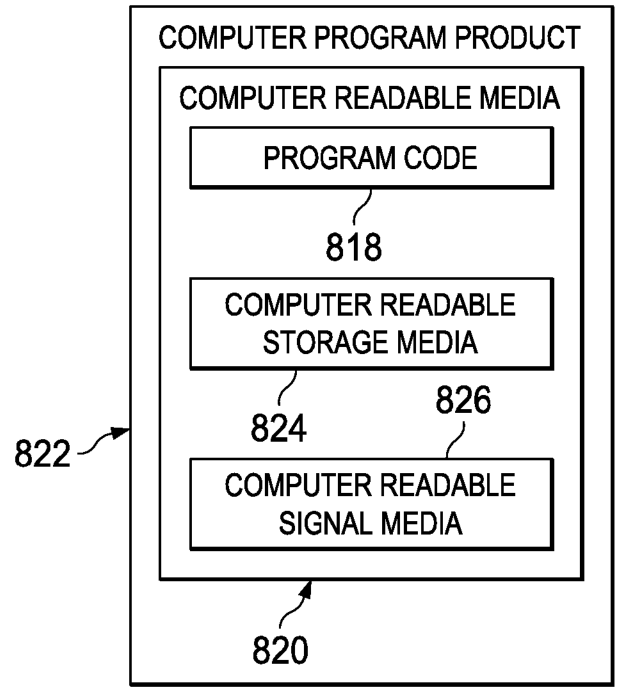

Attention is now turned to the Figures. FIG. 1 is flowchart of a method for displaying an image, in accordance with an illustrative embodiment. Process 100 shown in FIG. 1 may be implemented using a system including stereoscopic projection equipment configured to project an image onto a complex surface of a physical object disposed in an area. As used herein, the term "complex surface" is defined as a real surface of a real object, the surface having at least one curve or angle. A complex surface may have many objects with many turns, angles, corners, curves, and possibly disjointed features, and may be highly complex (such as a circuit board, for example). The system used to implement process 100 may also include a device worn by a user or disposed on a mobile device, such as shutter glasses, color glasses, polarized glasses, or other aid for viewing the appearance of a three-dimensional projection. The system may also include a computer configured to control the projector and/or stereoscopic shutter glasses. An example of such a computer is shown in FIG. 8. The system may also include cameras configured to measure a position and orientation of a user or a mobile device wearing the glasses.

While the following flow is described as a "process" performing one or more actions, this "process" is defined as a tangible device taking one or more steps. For example, a computer may control the projector and/or stereoscopic glasses, a camera may receive and process an image, and a projector may project photons necessary or desirable to project a desired image.

Returning to FIG. 1, the process may warp the image based on a geometry of the complex surface (operation 102). The process then may track a position and orientation of the user or the mobile device (operation 104). In one example, the process may track a position and orientation of the user's point of view or, in the case of a mobile device, may track the mobile device. The process may then further warp and modify the image based on the position and orientation (operation 106). The process may terminate thereafter.

Process 100 of FIG. 1 may be further varied. For example, a total warping of the image may cause the image to appear to the user or the mobile device as a three-dimensional representation of a virtual object as seen from a perspective of the user or the mobile device at the position. In another illustrative embodiment, the three-dimensional image further comprises a moving image, such as a video or movie demonstrating a particular set of operations and parts used with regard to the physical object.

In the case where the physical object is a part, such as a part of an aircraft, the image further may include written instructions for taking an action with the virtual object with respect to the physical object. In the case where the three-dimensional image is a tool, the moving image may include using the tool to perform an action with respect to the part. Other variations are possible. For example, the virtual object may be a virtual representation of a second physical object to be added to the physical object.

Figure 2:
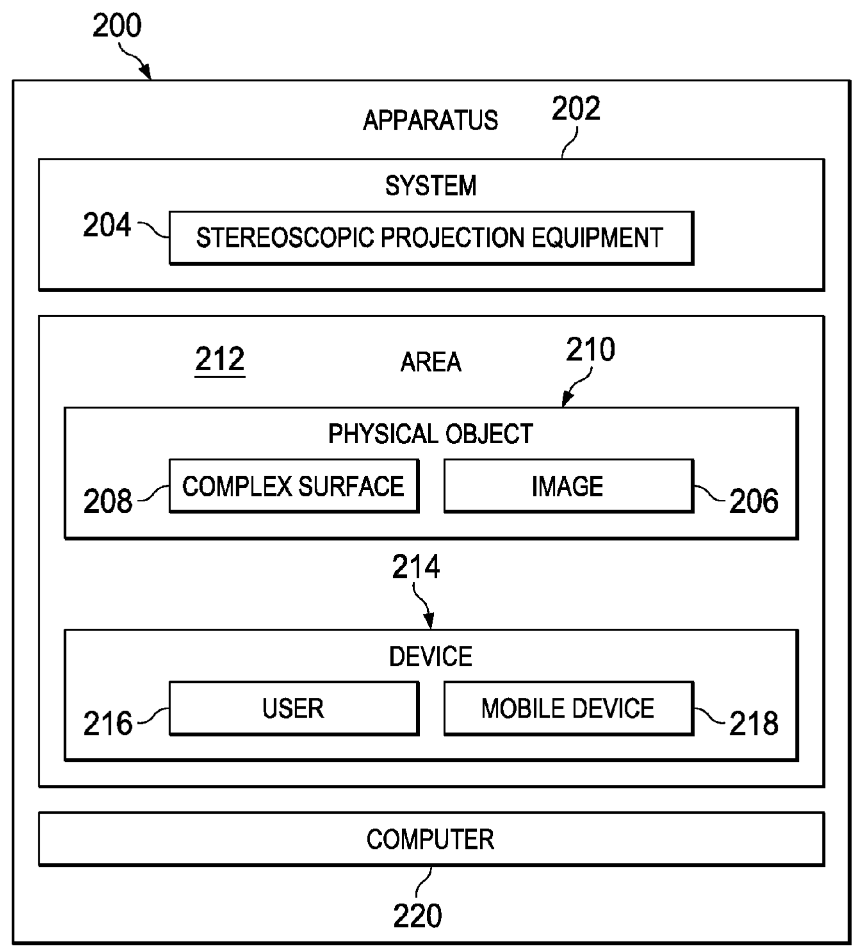
FIG. 2 is a block diagram of an apparatus for displaying an image, in accordance with an illustrative embodiment.

FIG. 2 is a block diagram of an apparatus for displaying an image, in accordance with an illustrative embodiment. Apparatus 200 may be used to implement process 100 of FIG. 1.

Apparatus 200 may include system 202. System 202 may include three-dimensional stereoscopic projection equipment 204. Stereoscopic projection equipment 204 may be configured to project image 206 onto complex surface 208 of physical object 210 disposed in area 212. Complex surface 208 includes at least one curve or angle. System 202 also includes device 214 worn by user 216 or disposed on mobile device 218. The term "complex surface" is defined formally above.

Apparatus 200 also includes computer 220. Computer 220 is in communication with apparatus 200. Computer 220 may be configured to cause apparatus 200 to warp image 206 based on a geometry of complex surface 208. Computer 220 may further be configured to track, using device 214, a position and orientation of user 216 or mobile device 218. The computer may be further configured to cause apparatus 200 to further warp image 206 based on the position and orientation.

Apparatus 200 may be further varied. For example, system 202 may be further configured such that a total warping of image 206 causes image 206 to appear to user 216 or mobile device 218 as a three-dimensional representation of a virtual object as seen from a perspective of user 216 or mobile device 218 at the position. In another example, complex surface 208 may be part of a first part. In this case, computer 220 may be further configured to cause system 202 to project one or more images selected from the group consisting of: first images of assembling a second part on the first part, second images of disassembly of the first part, third images of reworking of the first part, fourth images of using a tool on the first part, fifth images comprising written instructions for taking an action with respect to the first part, and sixth images for inspecting the first part, and seventh images for a demonstration of use of the first part.

Figure 3:
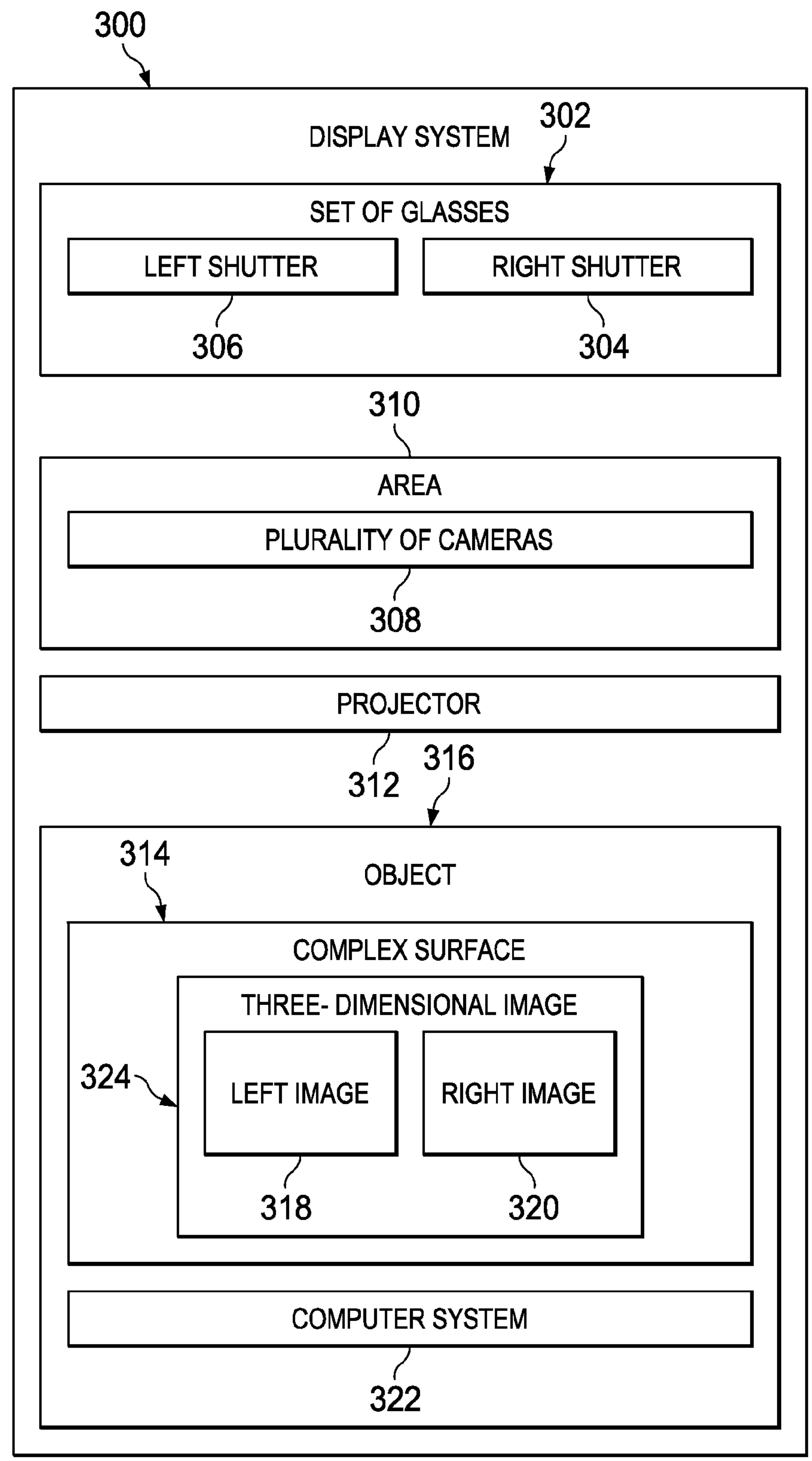
FIG. 3 is a block diagram of a display system, in accordance with an illustrative embodiment.

FIG. 3 is a block diagram of a display system, in accordance with an illustrative embodiment. Display system 300 may be, for example, part of system 202 and/or apparatus 200 of FIG. 2. Display system 300 may be used to implement process 100 shown in FIG. 1.

Display system 300 may include set of glasses 302. Set of glasses 302 may include right shutter 304 for covering a right eye of a user and left shutter 306 for covering a left eye of the user.

Display system 300 may also include plurality of cameras 308 oriented to observe the user as the user moves within area 310 and to sense a position and orientation of the user in area 310. Display system 300 may also include projector 312 configured to project, onto complex surface 314 of object 316, right image 320 for the right eye and left image 318 for the left eye. The complex surface includes at least one curve or angle. The term "complex surface" is defined above.

Display system 300 may also include computer system 322 in communication with set of glasses 302, plurality of cameras 308, and projector 312. Computer system 322 may be, for example, data processing system 800 of FIG. 8.

Computer system 322 may be configured to cause projector 312 to project left image 318 when left shutter 306 is open and to project right image 320 when right shutter 304 is open. Computer system 322 may be further configured to cause set of glasses 302 to close right shutter 304 and open left shutter 306 when left image 318 is projected, and to close left shutter 306 and open right shutter 304 when right image 320 is projected.

Computer system 322 may be further configured to warp left image 318 and right image 320 to fit complex surface 314. Warping may be further based on the position of the user in area 310. Left image 318 and right image 320 may be configured such that user will perceive three-dimensional image 324 projected onto complex surface 314.

The illustrative embodiments described above may be further varied or expanded. For example, the position of the user may be a three-dimensional position of the user in the area. The complex surface may comprises a physical part, such as a part to be assembled, disassembled, maintenance, or otherwise worked-on.

In an illustrative embodiment, left image 318 and right image 320 may be a virtual modification of the physical part. In this case, the virtual modification of the physical part may be a virtual representation of a second physical part to be added to the physical part. Additionally, left image 318 and right image 320 further may include virtually displayed written instructions for attaching the second physical part to the physical part.

In still another illustrative embodiment, left image 318 and right image 320 may also include a virtual tool used for attaching the second physical part. Additionally, left image 318 and right image 320 further may include virtually displayed written instructions for attaching the second physical part to the physical part. Left image 318 and right image 320 further may include a virtual tool used for attaching the second physical part. In this case, computer system 322 may be further configured to cause a moving image of using the virtual tool to install the second physical part.

In an illustrative embodiment, the virtual modification may be a moving image of replacing a virtual component of the physical part. Alternatively, the virtual modification may be a moving image of removing a portion of the physical part. Further, the virtual modification, may be a moving image of using a virtual tool on the physical part.

Additional variations are also possible. Most generally, any image, set of images, moving images, or sequence of images may be projected onto a part to appear as either two dimensional or three-dimensional images that assist a mechanic or technician to perform some kind of activity with respect to an object having a complex surface. In this manner, the mechanic or technician might not require as much time finding and interpreting instructions for a procedure to be taken with respect to the object.

Figure 4:
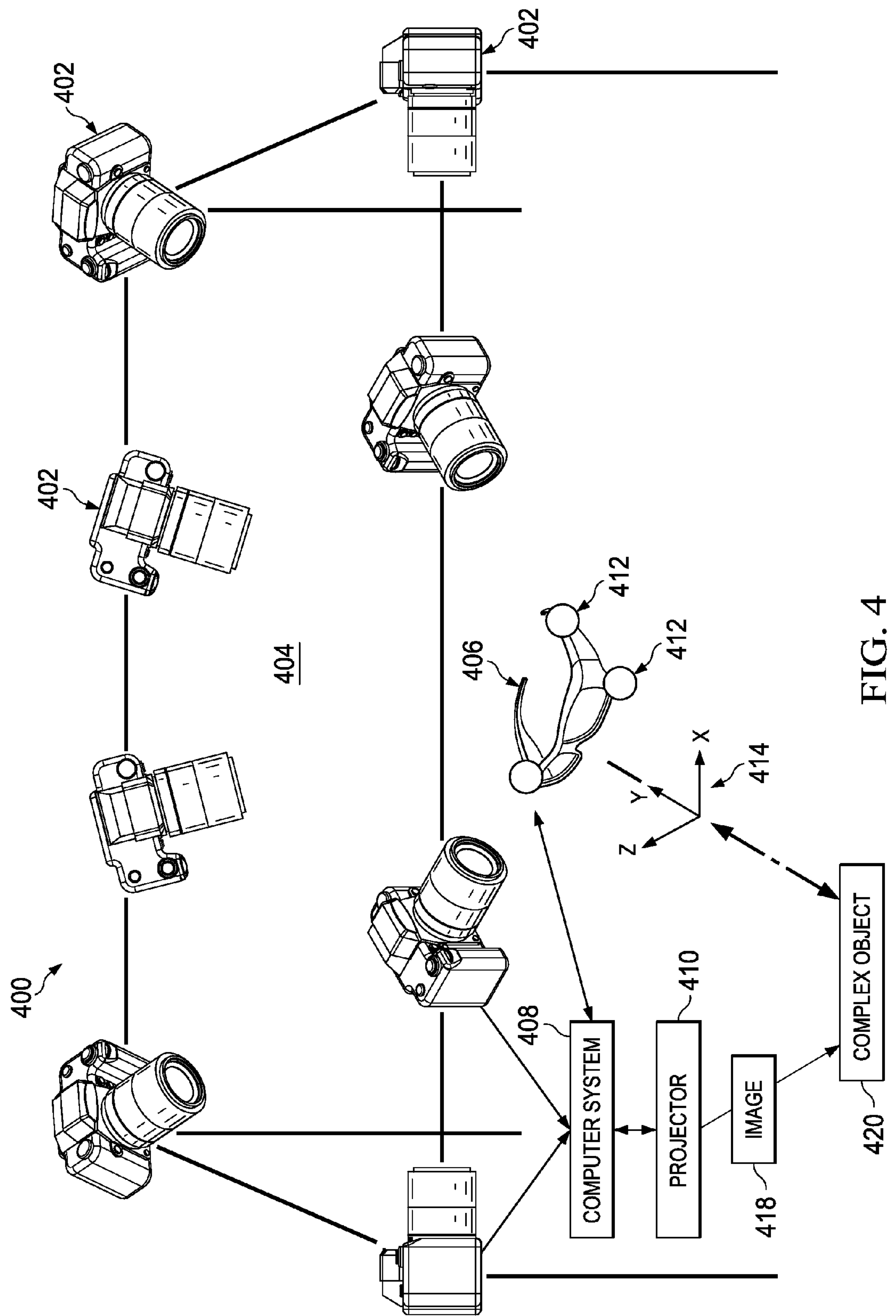
FIG. 4 is an example of a display system, in accordance with an illustrative embodiment.

FIG. 4 is an example of a display system, in accordance with an illustrative embodiment. Display system 400 may be an example of display system 300 of FIG. 3 or apparatus 200 of FIG. 2. Display system 400 may be used to implement process 100 of FIG. 1.

Display system 400 includes at least one camera, but preferably two or more cameras 402 placed around selected locations in area 404. Area 404 may be a room, manufacturing area, or any space defined by a boundary defined by cameras 402.

Display system 400 also includes set of glasses 406, computer system 408, and projector 410. Each of cameras 402, set of glasses 406, and projector 410 are in communication with computer system 408. Computer system 408 may or may not be in or near area 404. Computer system 408 may be one or more computers, possibly operating remotely.

Cameras 402 may be motion capture cameras. Cameras 402 may sense positions of markers 412 on set of glasses 406. Thus, computer system 408 may take as input changing positions of set of markers 412 relative to coordinate frame 414 defined for area 404. Computer system 408 thus may determine a position and an orientation of set of glasses 406. However, cameras 402 may also be used to sense a position and orientation of a human user, a part of a human user (such as the user's head), or a machine such as a robot or other mobile device. Thus, for example, a user may observe through additional cameras on the robot or other mobile device, and covered by set of glasses 406, so that user may perform operations remotely.

In any case, computer system 408 controls projector 410 to project image 418 on complex object 420. Image 418 may be an actual two-dimensional image. However, when viewed through set of glasses 406 the user will perceive on complex object 420 that image 418 is a three-dimensional image. Set of glasses 406 may be stereoscopic glasses, colored glasses, polarized glasses, or some other device for allowing a user to believe he or she is perceiving image 418 as three-dimensional, when in fact image 418 is projected onto complex object 420 as a two-dimensional image.

Image 418 may be warped in order to account for movements of the user and also a complex surface of complex object 420. If image 418 were not warped, then as the user moved about area 404 image 418 would become distorted and appear incorrect or, in extreme cases, possibly incomprehensible. Likewise, because complex object 420 is not a simple two-dimensional object (such as a movie screen), image 418 again would appear distorted or incorrect, or possibly incomprehensible, if image 418 is not warped. Computer system 408 may warp image 418 to accommodate both distortion effects. Thus, computer system 408 may control projector 410 to project a warped image that takes into one or both of movement of the user and a complex geometry of complex object 420.

Thus, no matter where a user moves in area 404, and regardless of the geometry of the surface of complex object 420, the user will perceive image 418 as being correct. As used herein the term "correct" means the user perceives a projected image that appears as a corresponding real object would appear on complex object 420, taking into account a position and perspective of the user. Thus, for example, as a user moves about area 404, the user will perceive a tool (such as a power drill in a non-limiting example) in the same changing orientations as the user would see had the tool been a real tool in the same position as image 418 with respect to complex object 420.

While display system 400 may be used to assist a mechanic or technician to assemble, disassemble, re-work, maintain, or otherwise use or modify a complex object, including the display of written instructions while the work is taking place, the illustrative embodiments are not limited to this use. For example, the illustrative embodiments may be used to give a guided interactive tour, or may be used for entertainment. Projected images may be in color or may be black and white.

Figure 5:
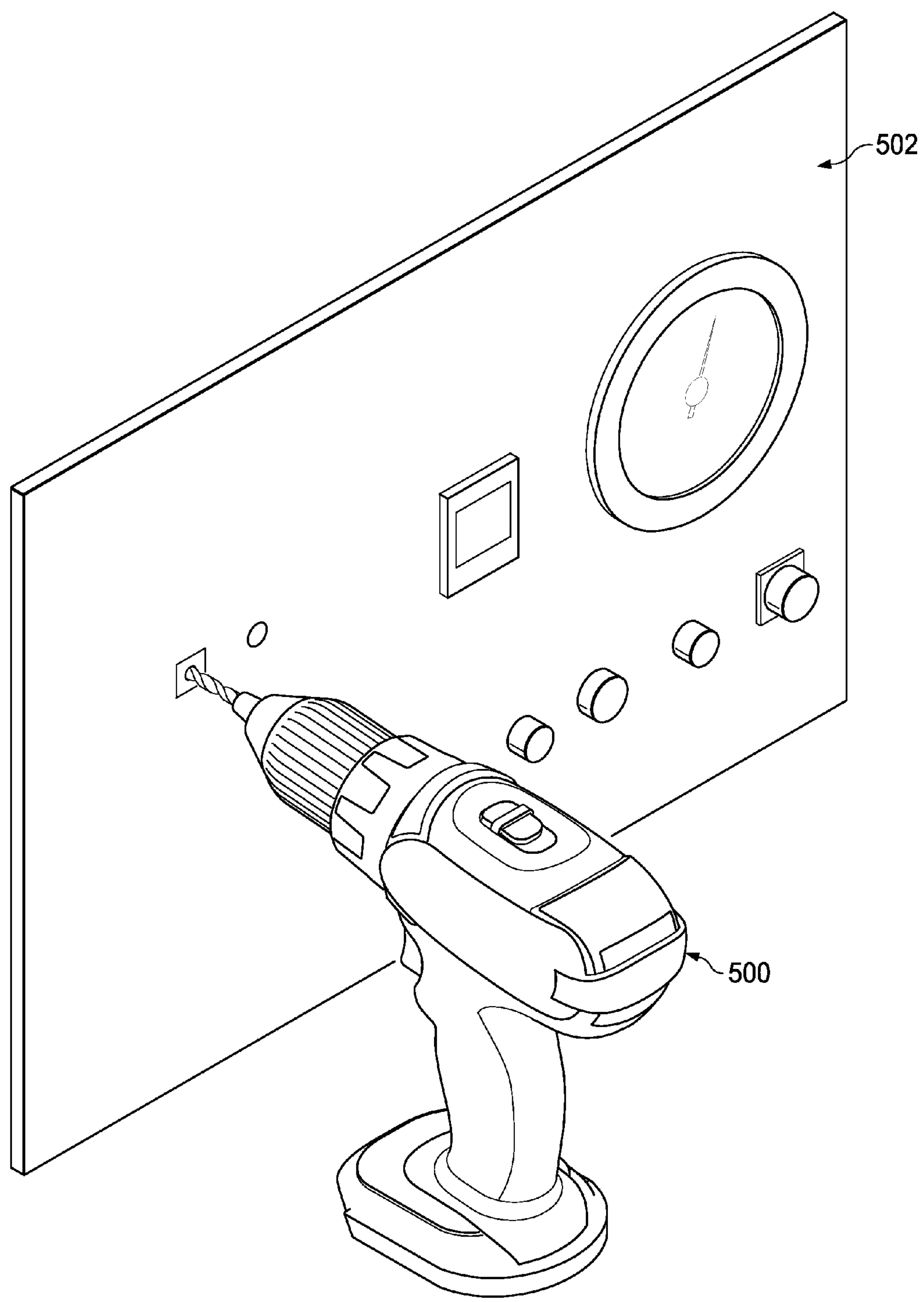
FIG. 5 is an example of an image displayed on an instrument panel, in accordance with an illustrative embodiment.
Figure 6:
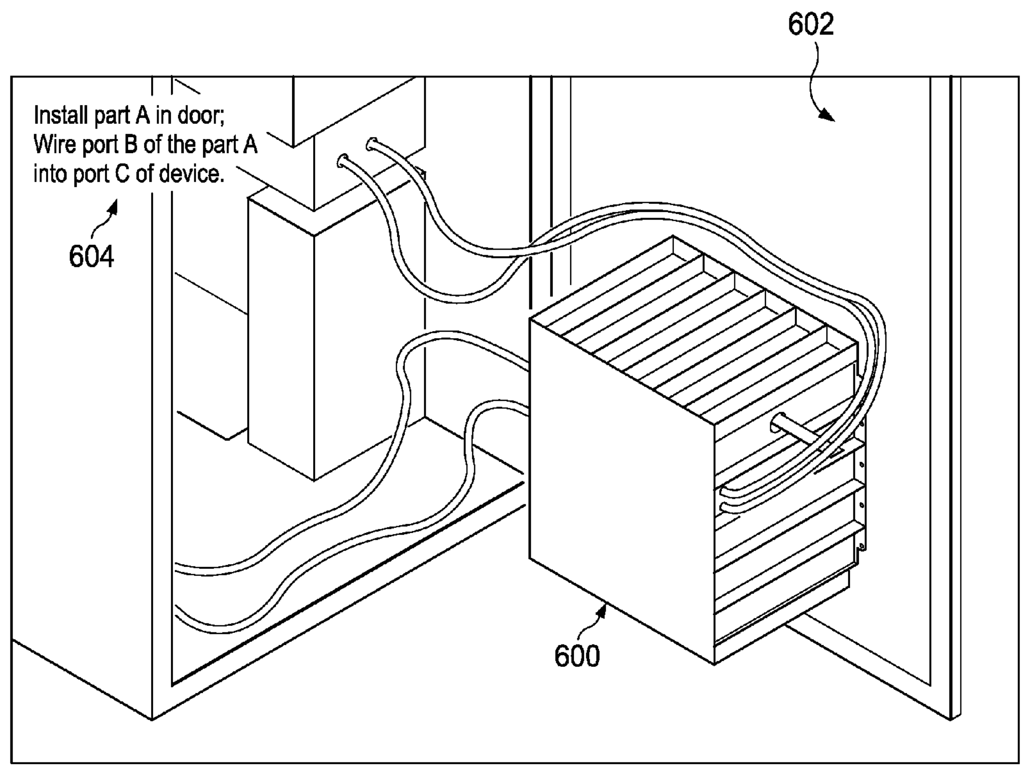
FIG. 6 is an example of an image displayed on a computer system, in accordance with an illustrative embodiment.
Figure 7:
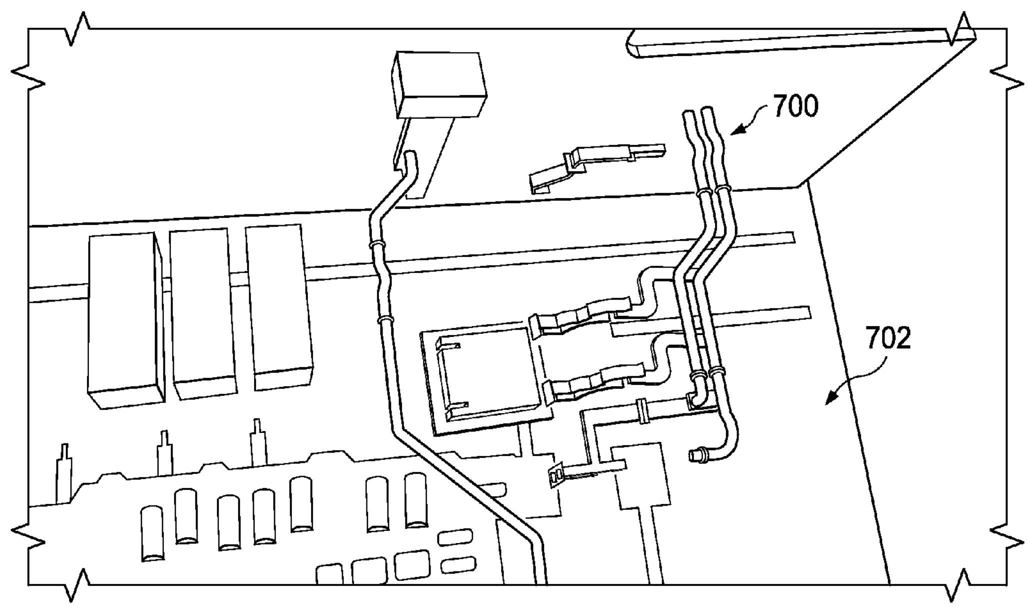
FIG. 7 is an example of an image displayed on a circuit board, in accordance with an illustrative embodiment.

FIG. 5, FIG. 6, and FIG. 7 are all examples of the illustrative embodiments in use. Thus, each of these Figures show what a user sees when a device, such as apparatus 200 of FIG. 2, display system 300 of FIG. 3, or display system 400 of FIG. 5 projects an image onto a real object in a manner that a user perceives a three-dimensional image. Each image shown in FIG. 5 through FIG. 7 may be produced using procedures similar to those described above with respect to FIG. 1 through FIG. 4. Although the images shown in FIG. 5 through FIG. 7 are specific examples of the illustrative embodiments in use, the claims and other uses of the illustrative embodiments are not necessarily limited to these examples.

FIG. 5 is an example of an image displayed on an instrument panel, in accordance with an illustrative embodiment. Image 500 appears to be a three-dimensional image of a drill drilling an image of hole into a real object, which in this case is instrument panel 502. While at first appearing to be a simple projection, such a projection is quite useful. For example, the exact position of the hole can be projected onto instrument panel 502 so that the user need not measure exactly where the hole is to be drilled. A user may then use a real drill to drill a hole at the position indicated. The specific drill to be used, and the specific drill bit to be used may also be shown or inferred. Written instructions, such as but not limited to instructions to control the rate of drilling, may also be projected.

As a user moves his or her head to gain different perspectives of image 500, the projection will change so that the user perceives image 500 in the same orientation as if a real drill had been present. Thus, for example, a user may perceive a side of the drill and a position of a chuck on the drill not perceivable except from the side, or any information desired to be projected.

FIG. 6 is an example of an image displayed on a computer system, in accordance with an illustrative embodiment. In this case, image 600 is an image of a part to be installed into a real computer or an electronic device, designated as device 602. In this case, the correct orientation of the part is shown as part of image 600. Additionally, images of the wiring used to install the part are also shown, including images of which wire is to be attached to which corresponding input or output in device 602. In this manner, a mechanic or technician can easily see how and where the part is to be installed, and how and where the new part is to be wired with respect to device 602. Again, written instructions 604 may be projected onto device 602 detailing how the part is to be installed. Note that the projection of the written instructions must also be properly warped so as to take into account the user's head position and the complex geometry of device 602. If not properly warped, the written instructions may be unintelligible as the user moves his or her head, or if projected onto a highly detailed surface such as that shown on device 602.

FIG. 7 is an example of an image displayed on a circuit board, in accordance with an illustrative embodiment. Image 700 is projected onto the highly contoured surface of real circuit board 702. Image 700 shows additional parts and wiring to be added to circuit board 702. From this image a technician can quickly see what parts are needed and where and how these parts should be added. The technician can also quickly see how parts are to be wired. Different wires and different parts can appear in different colors, so as to aid the technician in understanding how to proceed. Written instructions may also be projected in order to guide and instruct the technician. Additionally, a moving picture may be shown that indicates the parts being installed in a desired order or according to a desired procedure.

The illustrative embodiments described above may be still further varied. Any image helpful for assembling, disassembling, re-working, maintenance, or otherwise manipulating an object may be projected directly onto the object. Written instructions or movies may be projected. Additional material may also be projected that is not necessarily relevant to the operation, if desired. If an audio system is provided, the computer controlling the projection apparatus may further cause audio instructions or other appropriate audio feedback for the technician or mechanic. For example, an audio voice may instruct the technician to take a particular action and then assure the technician that success is indicated by hearing an audible "click", or other noise, after taking the particular action. Thus, the illustrative embodiments may be varied from those described above, and the specific examples provided herein do not necessarily limit the claimed inventions.

FIG. 8 is an illustration of a data processing system, in accordance with an illustrative embodiment. Data processing system 800 in FIG. 8 is an example of a data processing system that may be used in conjunction with the techniques described above. In this illustrative example, data processing system 800 includes communications fabric 802, which provides communications between processor unit 804, memory 806, persistent storage 808, communications unit 810, input/output (I/O) unit 812, and display 814.

Processor unit 804 serves to execute instructions for software that may be loaded into memory 806. Processor unit 804 may be a number of processors, a multi-processor core, or some other type of processor, depending on the particular implementation. A number, as used herein with reference to an item, means one or more items. Further, processor unit 804 may be implemented using a number of heterogeneous processor systems in which a main processor is present with secondary processors on a single chip. As another illustrative example, processor unit 804 may be a symmetric multi-processor system containing multiple processors of the same type.

Memory 806 and persistent storage 808 are examples of storage devices 816. A storage device is any piece of hardware that is capable of storing information, such as, for example, without limitation, data, program code in functional form, and/or other suitable information either on a temporary basis and/or a permanent basis. Storage devices 816 may also be referred to as computer readable storage devices in these examples. Memory 806, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these examples, provides for communications with other data processing systems or devices. In these examples, communications unit 810 is a network interface card. Communications unit 810 may provide communications through the use of either or both physical and wireless communications links.

Input/output (I/O) unit 812 allows for input and output of data with other devices that may be connected to data processing system 800. For example, input/output (I/O) unit 812 may provide a connection for user input through a keyboard, a mouse, and/or some other suitable input device. Further, input/output (I/O) unit 812 may send output to a printer. Display 814 provides a mechanism to display information to a user.

Instructions for the operating system, applications, and/or programs may be located in storage devices 816, which are in communication with processor unit 804 through communications fabric 802. In these illustrative examples, the instructions are in a functional form on persistent storage 808. These instructions may be loaded into memory 806 for execution by processor unit 804. The processes of the different embodiments may be performed by processor unit 804 using computer implemented instructions, which may be located in a memory, such as memory 806.

These instructions are referred to as program code, computer usable program code, or computer readable program code that may be read and executed by a processor in processor unit 804. The program code in the different embodiments may be embodied on different physical or computer readable storage media, such as memory 806 or persistent storage 808.

Program code 818 is located in a functional form on computer readable media 820 that is selectively removable and may be loaded onto or transferred to data processing system 800 for execution by processor unit 804. Computer readable media 820 may be referred-to as a non-transitory computer readable storage medium. Program code 818 and computer readable media 820 form computer program product 822 in these examples. In one example, computer readable media 820 may be computer readable storage media 824 or computer readable signal media 826. Computer readable storage media 824 may include, for example, an optical or magnetic disk that is inserted or placed into a drive or other device that is part of persistent storage 808 for transfer onto a storage device, such as a hard drive, that is part of persistent storage 808. Computer readable storage media 824 also may take the form of a persistent storage, such as a hard drive, a thumb drive, or a flash memory, that is connected to data processing system 800. In some instances, computer readable storage media 824 may not be removable from data processing system 800.

Alternatively, program code 818 may be transferred to data processing system 800 using computer readable signal media 826. Computer readable signal media 826 may be, for example, a propagated data signal containing program code 818. For example, computer readable signal media 826 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 818 may be downloaded over a network to persistent storage 808 from another device or data processing system through computer readable signal media 826 for use within data processing system 800. For instance, program code stored in a computer readable storage medium in a server data processing system may be downloaded over a network from the server to data processing system 800. The data processing system providing program code 818 may be a server computer, a client computer, or some other device capable of storing and transmitting program code 818.

The different components illustrated for data processing system 800 are not meant to provide architectural limitations to the manner in which different embodiments may be implemented. The different illustrative embodiments may be implemented in a data processing system including components in addition to or in place of those illustrated for data processing system 800. Other components shown in FIG. 8 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 804 may take the form of a hardware unit that has circuits that are manufactured or configured for a particular use. This type of hardware may perform operations without needing program code to be loaded into a memory from a storage device to be configured to perform the operations.

For example, when processor unit 804 takes the form of a hardware unit, processor unit 804 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 818 may be omitted because the processes for the different embodiments are implemented in a hardware unit.

In still another illustrative example, processor unit 804 may be implemented using a combination of processors found in computers and hardware units. Processor unit 804 may have a number of hardware units and a number of processors that are configured to run program code 818. With this depicted example, some of the processes may be implemented in the number of hardware units, while other processes may be implemented in the number of processors.

As another example, a storage device in data processing system 800 is any hardware apparatus that may store data. Memory 806, persistent storage 808, and computer readable media 820 are examples of storage devices in a tangible form.

In another example, a bus system may be used to implement communications fabric 802 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 806, or a cache, such as found in an interface and memory controller hub that may be present in communications fabric 802.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:

using a system comprising three-dimensional stereoscopic projection equipment to project an image onto a complex surface of a physical object disposed in an area, the complex surface comprising at least one curve or angle, the system also comprising a device worn by a user or disposed on a mobile device;

tracking a first position and first orientation of a point of view of the user or the mobile device;

warping the image based on a geometry of the complex surface and the first position and first orientation, wherein warping the image causes the image to appear to the user or the mobile device as a three-dimensional representation comprising a moving virtual object as seen from a first perspective of the user or the mobile device at the first position;

tracking a second position and second orientation of the point of view of the user or the mobile device; and further warping and modifying the image based on the second position and second orientation, wherein modifying the image comprises presenting the image as a view of the moving virtual object as seen from a second perspective of the user or the mobile device at the second position.

2. The method of claim 1, wherein the physical object comprises a part, and wherein the image further comprises written instructions for taking an action with the virtual object with respect to the physical object.

3. The method of claim 1, wherein the three-dimensional representation further comprises a tool, and wherein the image comprises using the tool to perform an action with respect to the physical object.

4. The method of claim 1, wherein the virtual object comprises a virtual representation of a second physical object to be added to the physical object.

5. An apparatus comprising:

a system comprising three-dimensional stereoscopic projection equipment configured to project an image onto a complex surface of a physical object disposed in an area, the complex surface comprising at least one curve or angle, the system also comprising a device worn by a user or disposed on a mobile device;

a computer in communication with the system, the computer configured to:

track, using the device, a first position and first orientation of a point of view of the user or the mobile device;

cause the system to warp the image based on a geometry of the complex surface and the first position and first orientation, wherein warping the image causes the image to appear to the user or the mobile device as a three-dimensional representation comprising a moving virtual object as seen from a first perspective of the user or the mobile device at the first position;

track, using the device, a second position and second orientation of the point of view of the user or the mobile device; and cause the system to further warp and modify the image based on the position and orientation, wherein modifying the image comprises presenting the image as a view of the moving virtual object as seen from a second perspective of the user or the mobile device at the second position.

6. The apparatus of claim 5, wherein the computer is further configured to cause the system to project one or more images selected from the group consisting of: first images of assembling a second part on the complex surface, second images of disassembly of the complex surface, third images of reworking of the complex surface, fourth images of using a tool on the complex surface, fifth images comprising written instructions for taking an action with respect to the complex surface, sixth images for inspecting the complex surface, and seventh images for a demonstration of use of the complex surface.

7. The method of claim 1, wherein modifying the image further comprises removing a portion of the virtual object.

8. The method of claim 1, wherein the first position comprises a first three-dimensional position of the user or the mobile device in the area.

9. The method of claim 8, wherein the second position comprises a second three-dimensional position of the user or the mobile device in the area.

10. The method of claim 1, wherein the complex surface is a circuit board.

11. The method of claim 10, wherein the image further comprises parts and wiring to be added to the circuit board.

12. The method of claim 1, wherein the image is a full-color image.

13. The method of claim 2, wherein the action is one of assembly, disassembly, or maintenance of the part.

14. The method of claim 3, wherein the tool is a drill.

15. The method of claim 4, wherein the virtual object further comprises a virtual representation of a third physical object to be added to the physical object, and wherein the image further comprises instructions directing an order in which the second physical object and third physical object are to be added to the physical object.

* * * * *